(12) United States Patent
Nanno

(10) Patent No.: US 6,970,272 B2
(45) Date of Patent: Nov. 29, 2005

(54) DUPLEX AUTOMATIC DOCUMENT FEEDER

(75) Inventor: Shigeo Nanno, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 819 days.

(21) Appl. No.: 09/927,173

(22) Filed: Aug. 9, 2001

(65) Prior Publication Data

US 2002/0054382 A1    May 9, 2002

(30) Foreign Application Priority Data

Aug. 25, 2000    (JP)    ............................ 2000-255950

(51) Int. Cl.[7] .............................................. H04N 1/04
(52) U.S. Cl. ...................................... 358/1.9; 358/498
(58) Field of Search ..................... 358/1.9, 498, 496, 358/495; 399/374, 367; 271/3.14; 355/23

(56) References Cited

U.S. PATENT DOCUMENTS 5,991,592 A * 11/1999 Kobayashi et al. ......... 399/374
6,618,575 B2 * 9/2003 Takida et al. ............... 399/367

FOREIGN PATENT DOCUMENTS

JP    11-005673    1/1999

* cited by examiner

Primary Examiner—Kimberly Williams
Assistant Examiner—Charlotte M. Baker
(74) Attorney, Agent, or Firm—Hogan & Hartson, LLP

(57) ABSTRACT

After both-sides of the document is read at the reading unit, the both-sides image reading unit feeds the document to the third document feeding path (R3) which does not pass through the reading unit and rotates the faces of the document to be discharged in its original page order. In this apparatus, between the edge position of the document which is to be the upper end when its feeding direction is reversed toward the reading unit again after the reading of the front side of the document, and the edge position of the document which is to be the upper end when its feeding direction is reversed toward the discharging member after the reading of the reverse side of the document, the intersecting point (R) of the third document feeding path (R3) leading to the document discharging tray (7c) is employed and the changeover member (39) is employed at the intersecting point (R). The document which its reverse side has been read, is lead to the third document-feeding path (R3) and is discharged according to its original page order.

11 Claims, 13 Drawing Sheets

DUPLEX AUTOMATIC DOCUMENT FEEDER

CROSS REFERENCES TO RELATED APPLICATIONS

This application claims priority under 35 USC 119 of Japanese Patent Application No.2000-255950 filed in JPO on Aug. 25, 2000, the entire disclosure of which is incorporated herein by reference.

BACKGROUND OF THE INVENTION

1. Field of the Invention

The present invention relates to a duplex automatic document feeder employed inside the image forming apparatus such as a copying machine.

2. Description of the Related Art

The conventional technology relates to the duplex automatic document feeder employed in an image forming apparatus, such as a facsimile apparatus, a copying machine, a scanner, a printer and a composite machine which includes at least two of the functions of the former. Regarding the both-sides image reading operation, the uppermost document of the document with image data on both-sides stacked on the document stacking tray is distributed to the platen located in the document feeding path. An image reading unit is located in the lower part of the platen, and the data on the first side of the document, which is facing upward when set on the document stacking tray, is read. The document is fed to the discharging roller employed in the document discharging port on the document discharging tray, and reverses the rotating direction when the lower end of the document has been fed to the discharging roller. The document is fed to the image reading unit again via the inverting path, and the second side of the document which is facing downward when set on the document stacking tray, is read.

Furthermore, when the lower end of the document has been fed to the discharging roller, the feeding direction of the document is reversed, the document is fed to the platen via the inverting path again, and without being read by the image reading unit, is discharged to the document discharging tray. Therefore, the document is stacked on the document discharging tray in the same page order as how it was when it was set in the document stacking tray.

However, after the reading operation of the both-sides of the document is completed, the document is fed to the image reading unit via the inverting path to arrange the document into the same page order as how it was when it was stacked on the document feeding tray. The document is not read by the image reading unit and is passed on, and is discharged from the document discharging port to the document-discharging tray employed in the lower position to the document discharging port. The document was fed again from this discharging tray to the document feeding path employing the image reading unit.

When the document is fed through the document feeding path which employs the image reading unit, without being read, the next document to be read cannot be taken in to the document feeding path from the document feeding tray. Thus, the speed of the reading operation of the both-sides of the document cannot be improved.

SUMMARY OF THE INVENTION

The present invention was made in consideration of the above matters.

The duplex automatic document feeder of the invention comprises a document stacking tray for stacking a set of documents; a document separating/feeding unit for separating the set of documents and feeding the documents one by one from the uppermost document thereof; an image reading unit for reading the image data on the first side of the document passing the image reading position; a document inverting unit for reversing the document feeding direction to read the image data on the second side of the document which passes the image reading position after the reading of the first side has been completed; a document discharging unit for piling up the documents on the document discharging tray after the front and the reverse side of the document, of which both-sides have been read, is reversed; a first transporting path for guiding the document from the document separating/feeding path to the image reading position; a second transporting path for guiding the document from the said image reading position to the document inverting unit; a third transporting path for guiding the document from the said document inverting unit to the first intersecting point of the first transporting path and from this first intersecting point to the said image reading position; and a fourth transporting path for guiding the document from the second intersecting point in the midst of the said third transporting path to the said document discharging unit.

Therefore, the document passes the image reading position twice in the both-sides reading operation, and the page order of the document discharged into the document discharging tray is to be the same order as how it was when stacked on the document stacking tray. Since the front and the reverse side of the document is reversed after the both-sides reading operation without passing the image reading position, and the reading of the next document is started while the prior document is being reversed, the document can be taken in. Thus, this result in the speeding up of the both-sides reading operation.

Moreover, an intersecting point of the third transporting path and the fourth transporting path is employed between the document edge position when feeding to the image reading position again via the third transporting path after the reading of the first side (the side facing upward on the document feeding tray) is completed in the both-sides reading operation of the duplex automatic document feeder, and the document edge position when feeding to the inverting path after the reading of the second side is completed. At this intersecting point, a flexible first switching member is employed for feeding the document to the fourth transporting path.

Therefore, when the lower end of the document does not passes the intersecting point, the document is fed to the third transporting path, the second side of the document is read, and when the lower end of the document passes through the intersecting point, the document is guided to the fourth transporting path by the switching member. Thus, there is no need to switch the switching member by the actuator, such as a solenoid, and the composition of the apparatus can be simplified and it leads to cost down.

Moreover, the document inverting unit and the document discharging unit is comprised of three rollers neighboring one another. Therefore, comparing to the case, in which each of the document inverting path and the document discharging unit is comprised of two rollers respectively, the number of the used members can be reduced and it leads to cost down. Furthermore, since there is no need to secure a place to employ the roller, the size of the apparatus can be miniaturized.

In the duplex automatic document feeder, a resist member to carry out skew correction on the document is employed in the downstream position of the junction. Therefore, there is no need to employ a resisting means to the document fed from the document feeding tray, and the document fed from the document inverting unit to read the second side, respectively, and the skew correction of the document can be carried out by one resisting means.

DETAILED DESCRIPTION OF THE INVENTION

Taking the facsimile as an example of the duplex automatic document feeder in the present invention, the whole structure of the duplex automatic document feeder will now be described.

Figure 1:
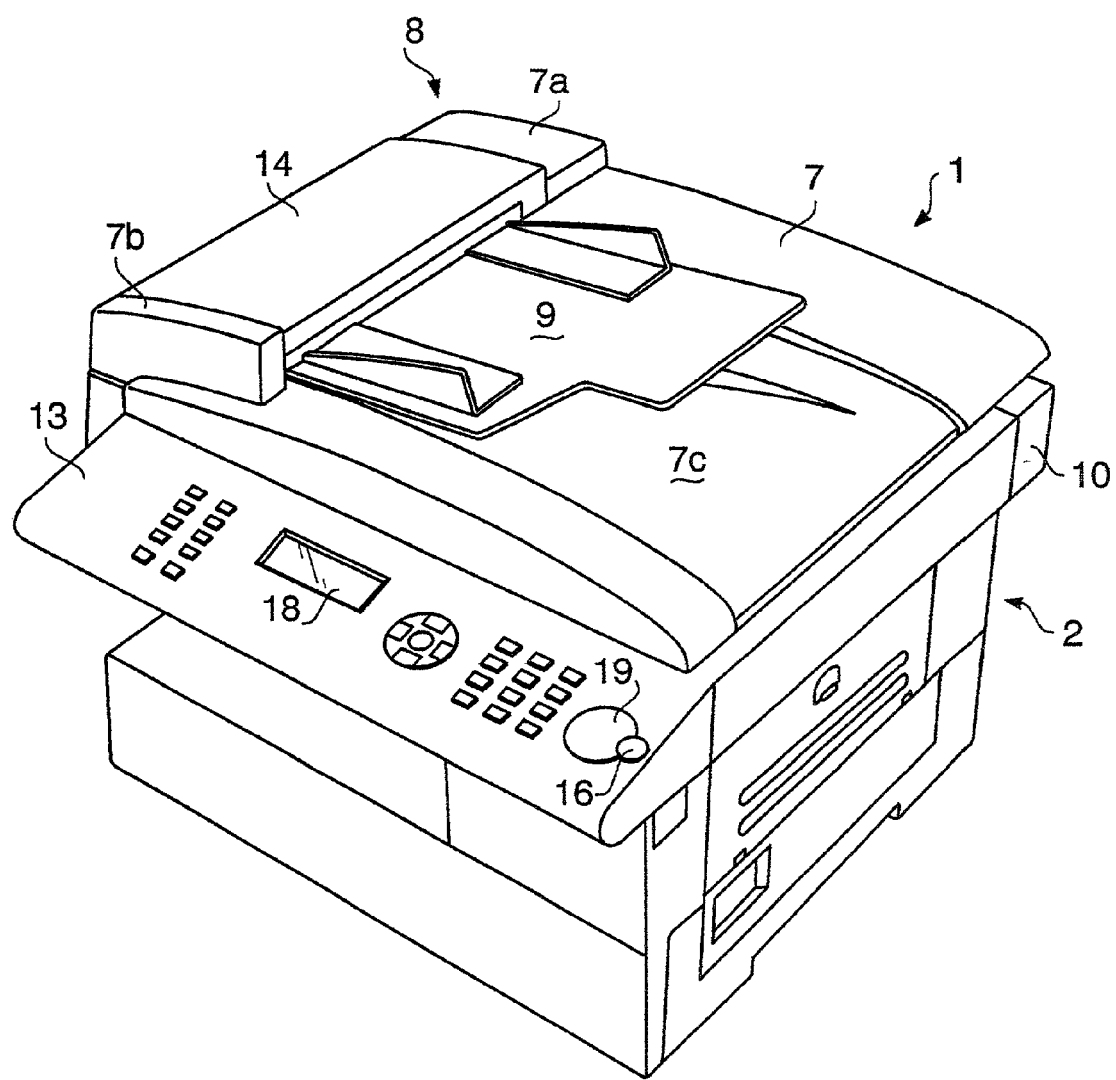
FIG. 1 is an enlarged perspective view diagram showing a facsimile which employs a duplex automatic document feeder.
Figure 2:
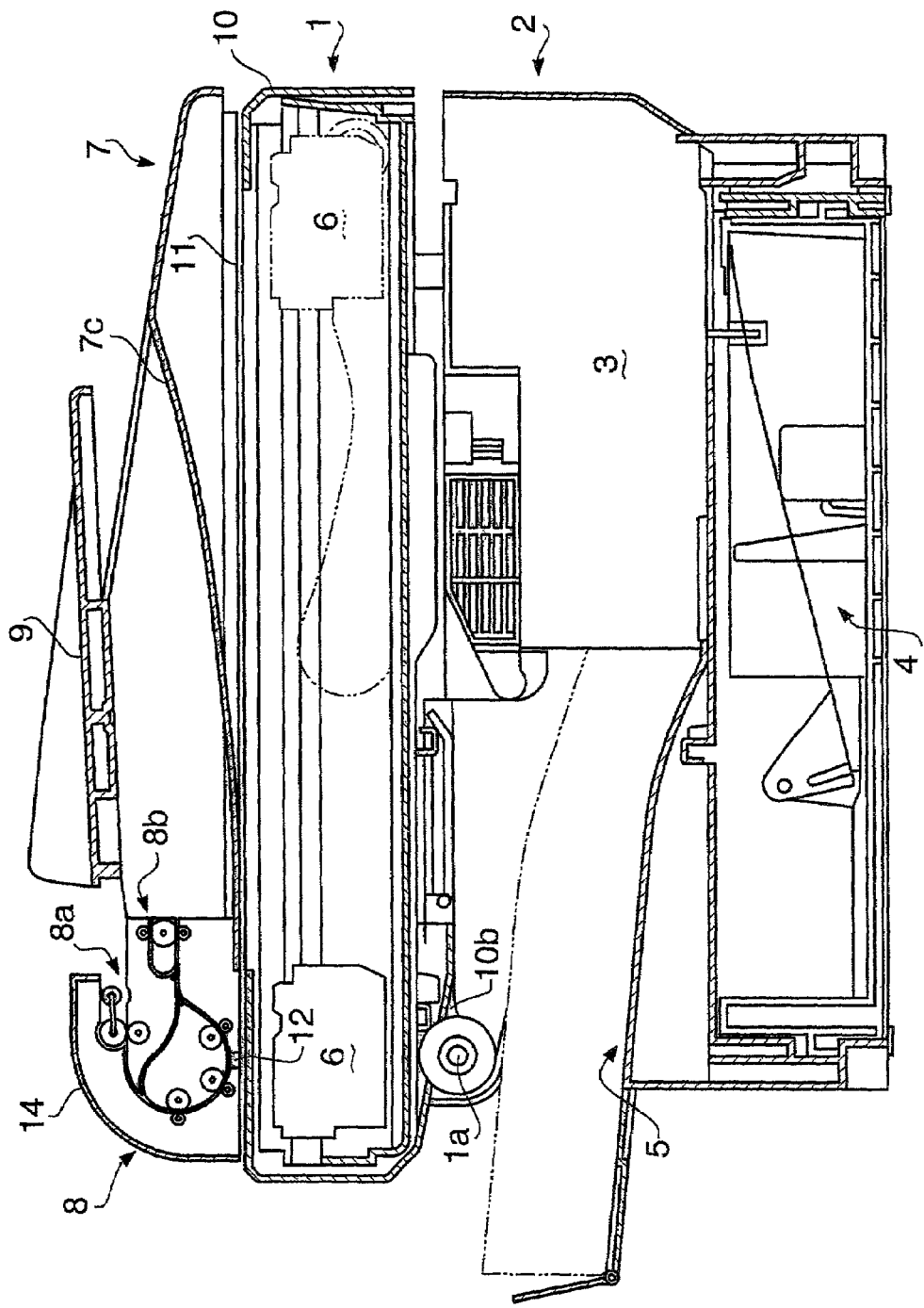
FIG. 2 is a side cross-sectional diagram of FIG. 1.

Referring to the facsimile shown in FIGS. 1 and 2, the reading unit 1 is employed on the upper part of the recording unit 2, the recording apparatus 3 is equipped inside the recording unit 2 on its upper side and the paper feeding cassette 4 on the lower side of the recording unit 2. The paper to be stored inside the paper feeding cassette 4 is fed to the recording apparatus 3, and after the recording is completed, the paper is discharged into the recording paper discharging tray 5.

The reading unit 1 is employed in the upper part of the recording unit 2. The hinge pin 10b is employed in the base of the reading frame 10 which is a part of the reading unit 1. Since the hinge pin 10b is pivoted by the hinge pin 1a employed in the recording unit 2, the reading unit 1 becomes capable of having a pivotal movement against the recording unit 2.

The scanner 6 is stored inside the reading frame 10 of the reading unit 1. The transparent flat bed 11 is employed on the surface of the reading frame 10, and when the document is placed on the flat bed 11, the scanner 6 employed in the lower part of the flat bed 11, moves from the solid line position to the dotted line position shown in FIG. 2 and scans.

The platen cover 7 which uses one of the edges of the reading unit 1 to have a pivotal movement, is employed in the upper part of the reading unit 1. The platen cover 7 presses down from the above the document placed on the flat bed 11.

The ADF 8 is employed in the side portion of the platen cover 7. As shown in FIG. 1 and FIG. 2, the outward appearance of the ADF 8 is such that the side frame 7a and 7b are employed in parallel to become at right angle with the scanning direction of the scanner 6, and the ADF cover 14 which covers the entire document feeding member of the ADF 8 is employed between the side frame 7a and 7b, and on the inside opening along the ADF cover 14 side edge of each side frame 7a and 7b, the side sheet made of metal plate not shown in the diagram is employed firmly in upright form, and for example, supports each end of the roller shaft of the drive roller of each of the feed rollers described below. One of or both of the side frame 7a and 7b covers the driving source and the drive mechanism of the drive roller and the inner side is covered with the side metal.

The platen cover 7 and the side frame 7a and 7b, the both side metals, the driving source of the drive roller and the drive mechanism equipped inside form the main body of the ADF 8, and its left and right are surrounded by the main body, and the document feeding member covered at the ADF cover 14 is employed, forming the whole ADF 8.

The document discharging tray 7c is formed in one on the surface of the platen cover 7 leading to the document discharging port 8c employed in the lower part of the document feeding port 8a of the ADF 8. The document stacking tray 9 is employed in the upper part of the document discharging tray 7c. This document stacking tray 9 is employed in the upper part of the platen cover 7, leading to the document feeding port 8a of ADF 8.

A stack of documents on the document stacking tray 9 is put into the document feeding port 8a from the uppermost sheet by the pick up roller 21. This document is fed to the platen glass 12 by the separate roller 22, the feeding roller 24, 26, etc. The scanner 6 is employed in the lower part of the platen glass 12 (refer to FIG. 2). The document, which is fed by ADF 8 and is passed over the platen glass 12, is read by the scanner 6 located in the initial position showed by solid line in FIG. 2, and the document is discharged onto the document discharging tray 7c from the document discharging port 8c.

The reading unit 1 is formed to adopt the scanner 6 as a flat bed typed scanner which scans for reading the resting document. The document is fed by the ADF 8, and the reading unit 1 is also formed as a sheet feed typed scanner which reads by the scanner 6, of which location is fixed.

The control panel 13 is employed on one side of the reading frame 10. By pressing the key of the control panel 13, many operations, such as the scanning of the document data, the set up of the receiver when sending the scanned data by the facsimile, the recording of the received data or the scanned data by the recording apparatus 3 can be performed.

The inner structure of the ADF 8 automatic document feeder in the present invention will now be described.

Figure 3:
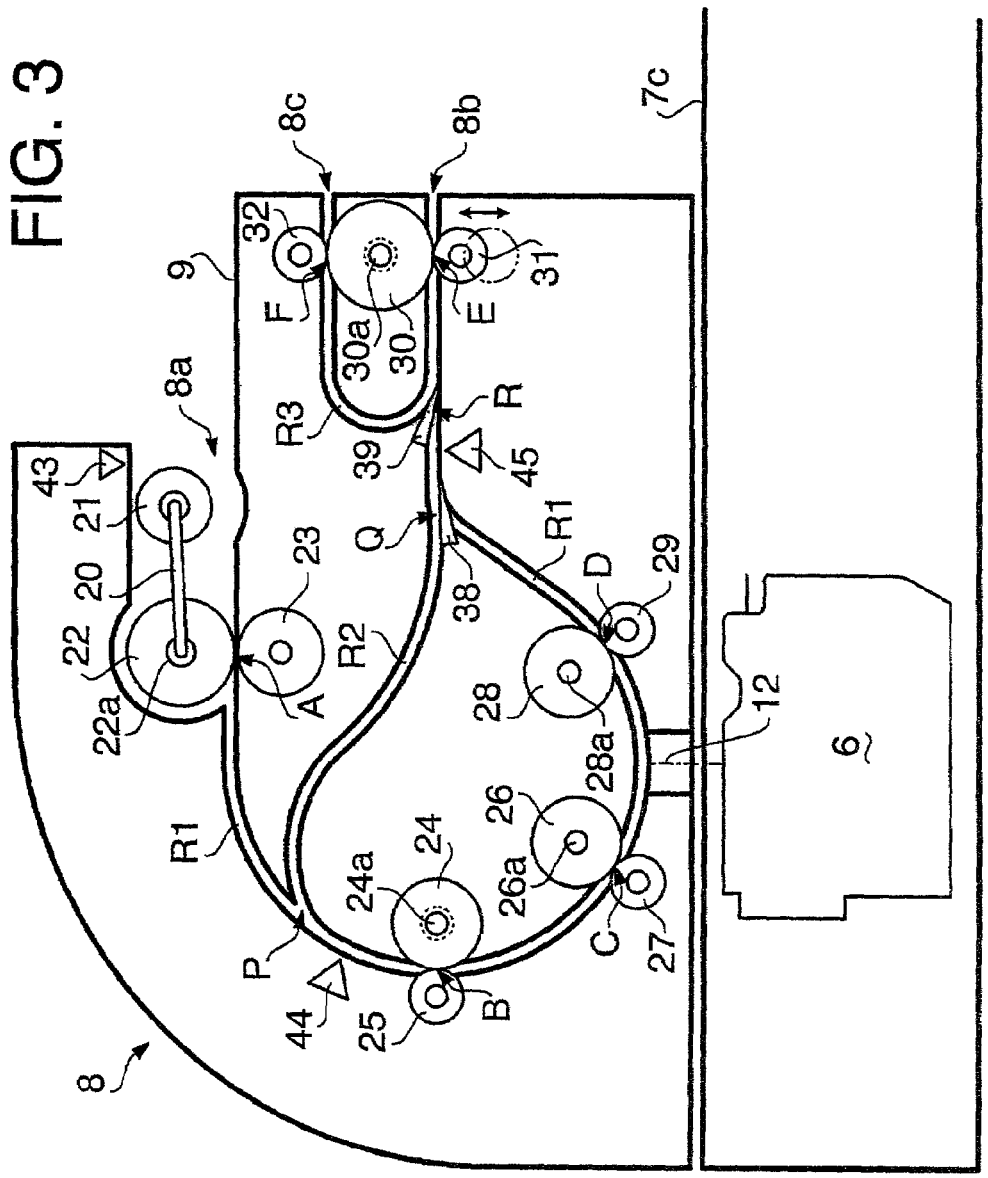
FIG. 3 is a side-cross sectional diagram showing the ADF of the both-sides image reading unit according to the present invention.

In this part of the description, regarding the side-cross view shown in FIG. 3, the document feeding direction is to be the lengthwise direction (the side of the document feeding port 8a and the document discharging port 8c as the front, the curved part {the feeding direction intersecting point} as the backward) and the orthogonal direction of the horizontal direction is to be the crosswise direction, and the vertical and lengthwise position of each of the structures will be described.

First, giving an outline of the document feeding path in the first embodiment of the present invention, as shown in FIG. 3, the temporary outlet 8b which reverses the document sheet feeding direction, is employed in the lower part of the document discharging port 8c, and the first document feeding path R1 with its cross-side view nearly in the shape of the letter C is formed from the document feeding port 8a to the temporary outlet 8b. In the first document feeding path R1, the intersecting point R and Q are employed in the rear end of the temporary outlet 8b, and the second document feeding path R2 is extended to further than the intersecting point Q, and are linked at the curved part of the first document feeding path R1. The linked point is to be the junction P, and the third document feeding path R3 in the shape of the cross-side view of the letter J laid down is formed toward the document discharging port 8c diagonally above the intersecting point R.

The employment of the roller, which feeds the document sheet is such that the extra roller 30, rotatable in either direction is arranged between the temporary outlet 8b and the document discharging port 8c, and the second pressure roller 32 and the first pressure roller 31 are arranged to have contacts at the document feeding path R3 and R1, on both the top and the bottom of the extra roller 30. The nip between the extra roller 30 and the first pressure roller 31 in the first document feeding path R1 is to be E, the nip between the extra roller 30 and the second pressure roller 32 in the third document feeding path R3 is to be F.

The separate roller 22 and the retard roller 23 are employed near the document feeding port 8a. This separate roller 22 and the retard roller 23 form the nip A. The arms 20 are arranged toward the front from the front edge of the separate roller 22, freely swinging with the separate roller shaft as a fulcrum. In the front edge part of the arms 20, the pick up roller 21 is employed. Along the first document feeding path R1, between the document feeding port 8a and the temporary outlet 8b, the nip A of the separate roller 22 and the retard roller 23, the nip B of the resist roller 24 and the resist follow roller 25, the nip C of the first feed roller 26 and the first slave roller 27, the nip D of the second feed roller 28 and the second slave roller 29, the nip E of the extra roller 30 and the first pressure roller 31, are employed accordingly.

The pick up roller 21 puts into the document feeding port 8a the uppermost sheet of the stack of documents on the document stacking tray 9. This document is separated into one by one by the separate roller 22 which rotates in the same direction as the document feeding direction, and the retard roller 23 which rotates in the opposite direction of the document feeding direction. Then the document is fed into the first document feeding path R1.

Out of the rollers above, the rollers 22, 24, 26, 28, 30, are to be operated by the driving source and the driving mechanism arranged inside either one of or both of the side frame 7a and 7b. The rollers 22, 23, 24, 26, 28, 30 are the drive rollers and the rollers 25, 27, 29, 31, 32 are the driven rollers.

Directly behind the intersecting point Q, between the first document feeding path R1 and the second document feeding path R2, the first changeover member 38 which switches the document feeding paths R1 and R2 are employed. Directly behind the intersecting point R, between the first document-feeding path R1 and the third document feeding path R3, the second changeover member 39 which switches the document feeding paths R1 and R3 is employed. The flexible member such as a film or the like is used on the changeover members 38 and 39. Its elasticity or empty weight is utilized to open and close the path, or the actuator made of solenoid or the like is used to do the switching of the path electrically. The former is cheaper than the latter, and is also simple in its structure, thus in the first embodiment of the present invention, the former is employed. The first changeover member 38 and the second changeover member 39 normally shut the first document feeding path R1 by its empty weight, and when the document sheet passes, the first document feeding path R1 opens and closes.

The sensors related to the feeding of the document sheet will now be described.

The document set sensor 43 is arranged near the document feeding port 8a in the first document feeding path R1. When the document sheet is set at the inner most part of the document feeding port 8a, the document set sensor 43 detects it and the circuit between the start button 19 and the driving source 41 is connected, the driving source 41 is to be operated at any time. Contrary stating, when the document is not set, therefore not detected by the document set sensor 43, the circuit is kept shut and the driving source 41 does not start operating even when the start button 19 is pressed, thus misfeeding of the document is prevented.

Meanwhile, the first position detecting sensor 44 is arranged near the junction P of the first document feeding path R1 and the second document feeding path R2. The second position detecting sensor 45 is employed in the middle of the intersecting point Q and the intersecting point R at the first document feeding path R1. Both of the sensors detect the passage of the document.

Figure 13:
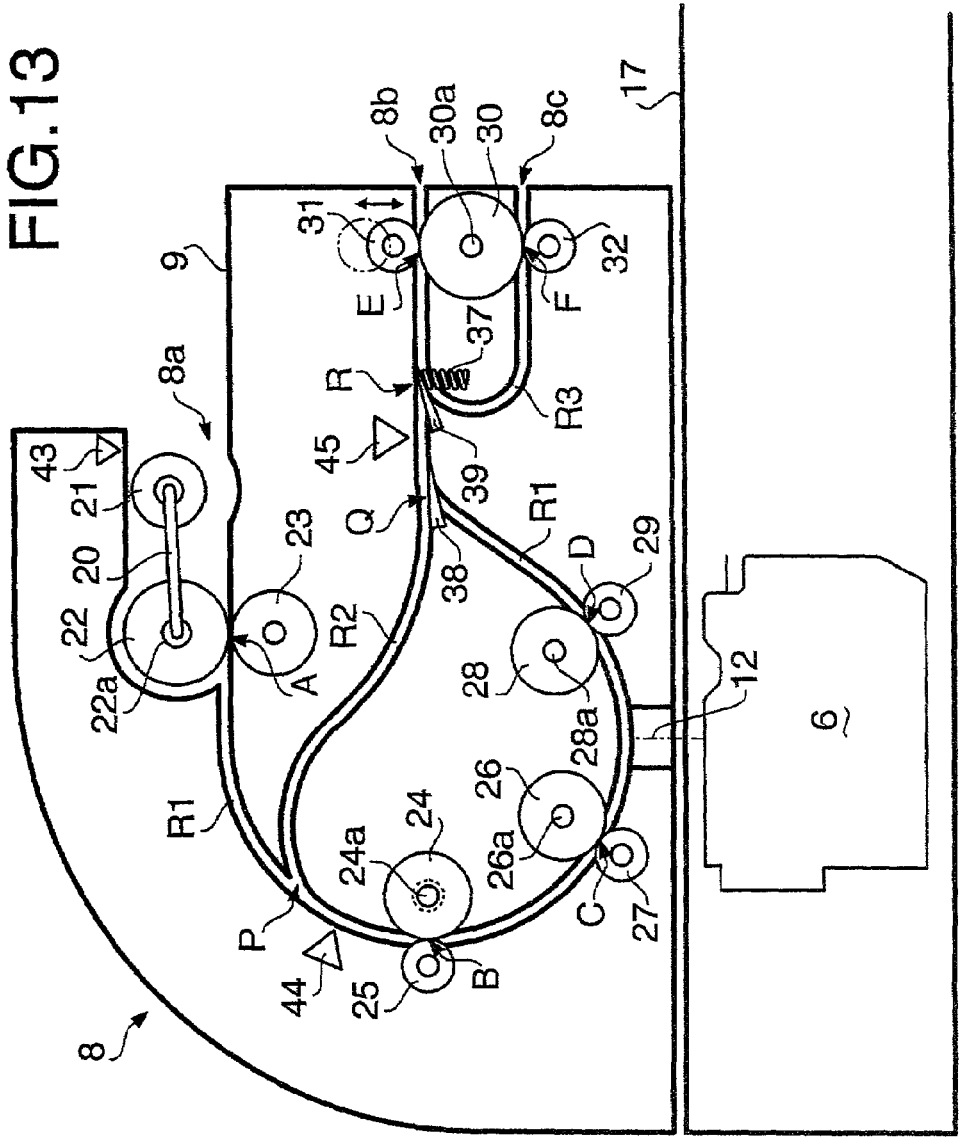
FIG. 13 is a cross-sectional diagram showing the ADF of the both-sides image reading unit according to the second embodiment in the present invention.

The document feeding path leading from the document feeding port 8a to the document discharging port 8c can be formed, as shown in FIG. 13 as another embodiment (the second embodiment) of the present invention.

The first document feeding path R1 and the second document feeding path R2 can be formed in the same way as in the first embodiment of the present invention. However, in the second embodiment of the present invention, the third document feeding path R3 is formed from the intersecting point R to the document discharging port 8c diagonally below, having a cross-side view of the shape of the letter J laid down.

The extra roller 30 rotatable in either direction is employed between the temporary outlet 8b and the document discharging port 8c. The first pressure roller 31 and the second pressure roller 32 are arranged so that they are contacting the document feeding path R1 and R3. The nip between the extra roller 30 and the first pressure roller 31 in the first document feeding path R1 is to be E, and the nip between the extra roller 30 and the second pressure roller 32 in the third document feeding path R3 is to be F.

The other rollers and the sensors are to be employed as in the first embodiment of the present invention.

The first changeover member 38 is employed directly behind the intersecting point Q in the first document feeding path as in the first employment of the present invention. The employment of the second changeover member 39 between the first document feeding path R1 and the third document feeding path R3, directly behind the intersecting point R will now be described. The elastic body such as the spring 37 or the like increases the force on the changeover member 39 from below, and normally shuts the first document feeding path R1, and opens and closes the first document feeding path R1 when the document sheet passes. The flexible member such as a film or the like is used on the changeover member 39, and normally is arranged to shut the first document feeding path R1, and may be formed to open and close the first document feeding path R1 when the document sheet passes.

The structure of the arrangement of the roller, the inverting path, and the structure of the changeover member or the like are not to be limited to the first embodiment and the second embodiment in the present invention above, but can be of other structure if it is related to any one of claims 1 through 5.

The following is the description related to the first embodiment of the present invention but can also be used to describe the second embodiment of the present invention just by changing the referring code number of the diagram.

The controller 40 of the duplex automatic document feeder in the present invention will now be described.

Figure 4:
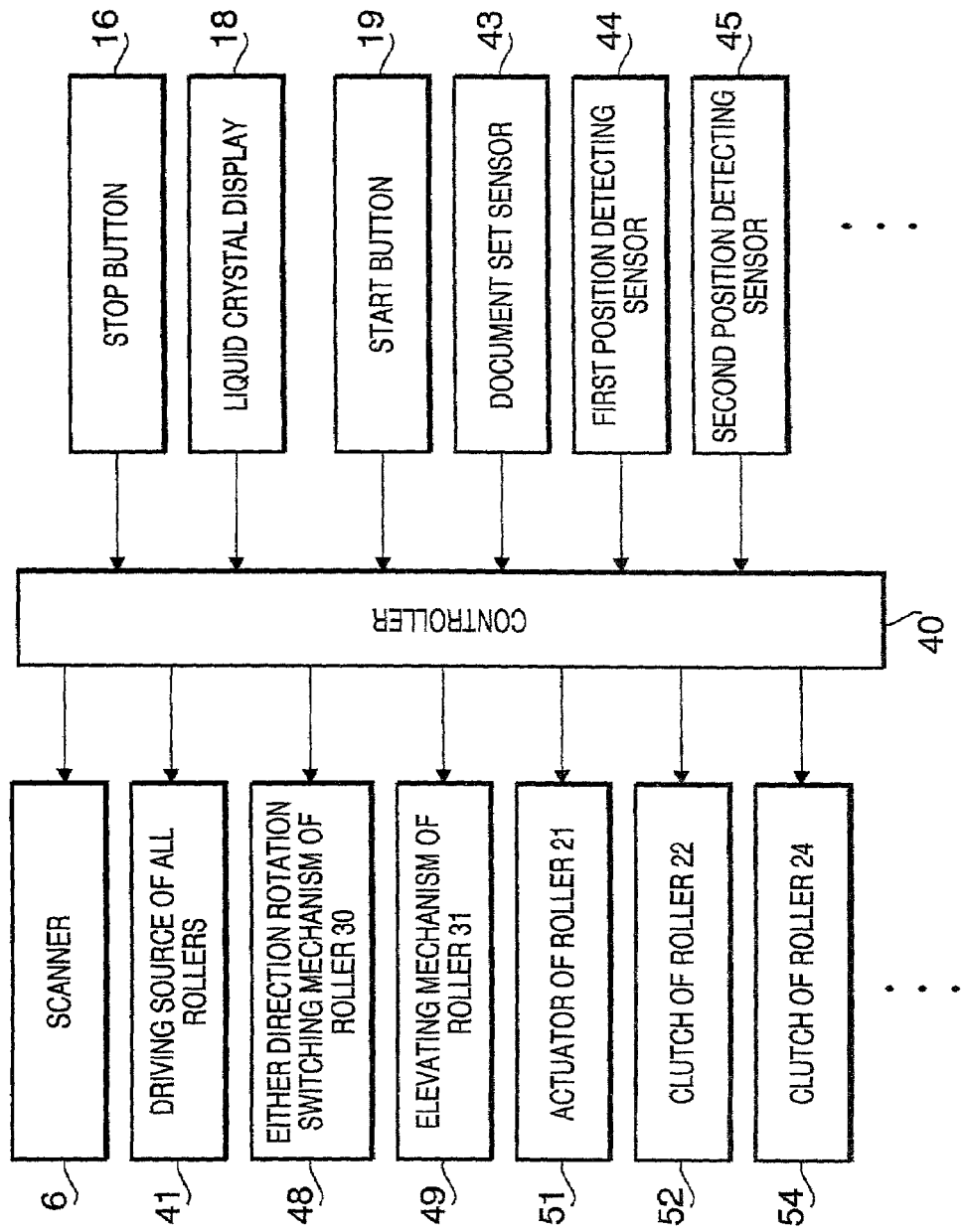
FIG. 4 is a block diagram showing the control mechanism of the both-sides image reading unit according to the present invention.

The controller 40 shown in FIG. 4, controls the feeding pattern of the document, and is connected to the sensor and the control member or the like described below.

Reference numerals 43, 44, 45 designate the position detecting sensor such as the linear scale or the like in which the light source is placed on one side of the feeding path, and the photo-acceptance unit placed on the other side, and the three detect the beginning and the ending of the passage of the document that passes the employed position of each of the sensors, and send control signal (detected signal) to the controller 40.

The driving source 41 operates by receiving the control signal (drive signal) from the controller 40, and operates each roller 22, 23, 26, 28, 30, 33 through the driving mechanism not shown in the diagram.

Further, the driving source 41 applies pulse to the polyphase windings of the stator accordingly, utilizes the stepping motor or the like which rotates the rotor in a fixed angle by each pulse, and the step control is performed at the controller 40 and counts the number of the rotating steps of the driving source 41, measuring the feeding distance of the document sheet.

The rotating direction of the roller 22, 24, 26, 28 is sequenced with the rotating direction of the driving source 41, and at the same time, the either direction rotation switching mechanism 48 is employed between the driving source 41 (and the extra roller 30) at the extra roller 30, despite the rotating direction of the driving source 41, the rotating direction is switched accordingly.

In the either direction rotation switching mechanism 48, the same direction transfer mechanism which transfers the rotation in the same direction with the driving shaft, and the reverse transfer mechanism which transfers the reversed rotating direction, are employed between a driving shaft where the motive power is transmitted from the driving source 41 and the output shaft which outputs to the extra roller 30, the clutch of the electromagnetic clutch or the like, spline fitted into the driving shaft or the output shaft is moved rubbing to a different position, the connection with the transfer mechanism on one side is canceled and is connected to the other transfer mechanism, and the rotation of only one of the either direction is picked out to the output shaft.

The structure of the either direction rotation switching mechanism 48 is not to be limited to the description above, but the new driving source of the extra roller 30 can be employed and the driving source can be rotated in either direction.

Thus when the control signal (switching signal) is output from the controller 40 to the either direction rotation switching mechanism 48, the rotating direction of the extra roller 30 switches.

Moreover, the control apparatus as to be described below is employed between each roller (the pick up roller 21, the separate roller 22, and the resist roller 33) and the driving source 41.

The pick up roller 21 undulates vertically by the actuator 51 of the solenoid or the like, receives the control signal (drive signal) from the controller 40 the pulse is applied on the solenoid, the actuator 51 functions to swing the pick up roller 21 downward and the document sheet is pressed down.

Between the driving source 41, the separate roller 22 and the resist roller 24, the clutch 52 and 54 of the electromagnetic clutch or the like are employed, the rollers receive the control signal (disconnecting signal) from the controller 40 and connects or disconnects the clutch 52 (54) and drives or stops the roller 22 (24).

The first pressure roller 31 is formed to be capable of swinging vertically by the elevating mechanism 49 formed by the cam mechanism or the like, and receives the control signal (elevating signal) from the controller 40, and changes the position of the first pressure roller 31 by vertically swinging. By separating the extra roller 30 and the first pressure roller 31, the upper end and the lower end of the document sheet of which the feeding direction is the opposite are able to pass one another smoothly at the nip D.

On the control panel 13 shown in FIG. 1, for example, the liquid crystal panel 18 which performs the setting of the reading mode such as the converting or the like of the single-side/both-sides reading, the start button 19 which starts the taking in of the document sheet, and the stop button 16 which interrupts the reading operation in the repetitive reading of the few pages of the document sheets are employed, and when the liquid crystal panel 18 and the start button 19, the stop button 16 or the like are operated, the control signal is output to the controller 40.

Figure 5:
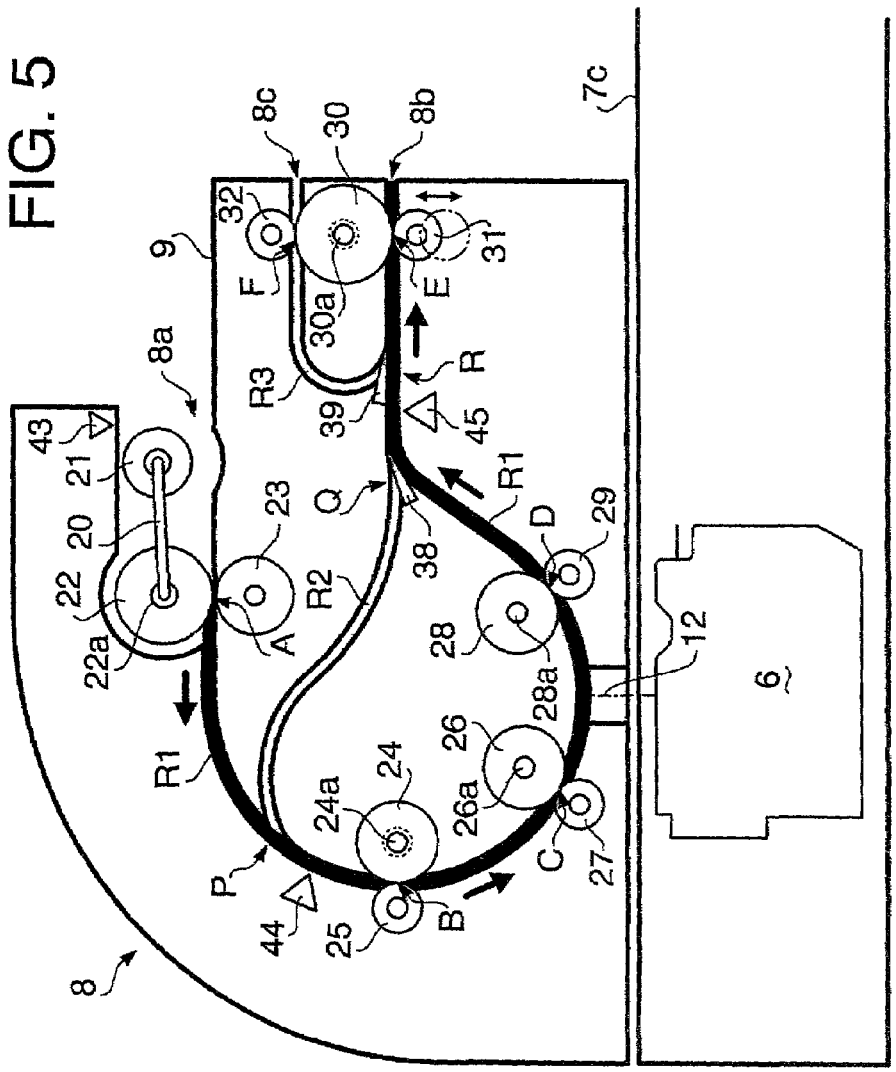
FIG. 5 is a side-cross sectional diagram showing the ADF which indicates the flow of the document in the first process of the both-sides image reading unit in the first embodiment in the present invention.
Figure 6:
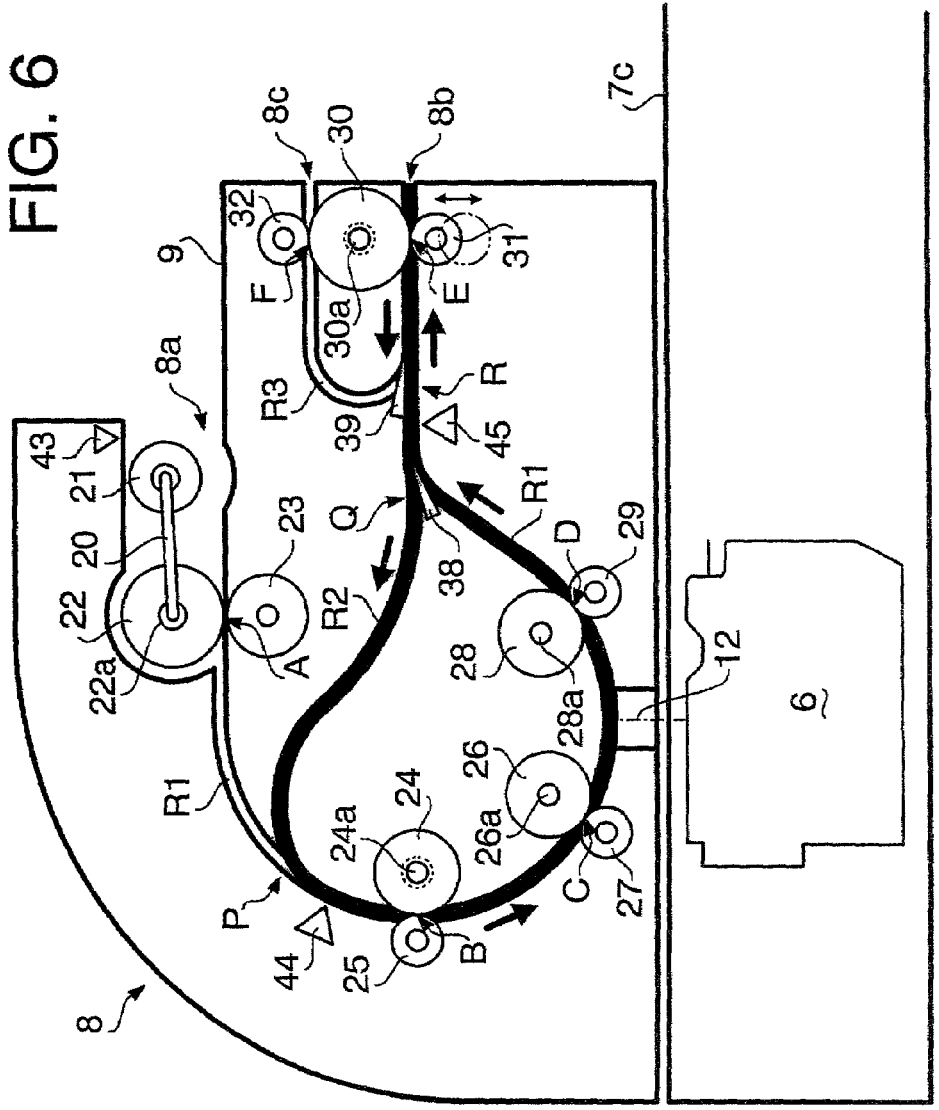
FIG. 6 is a side-cross sectional view of the ADF, similar to FIG. 5, showing the flow of the document in the second process.
Figure 7:
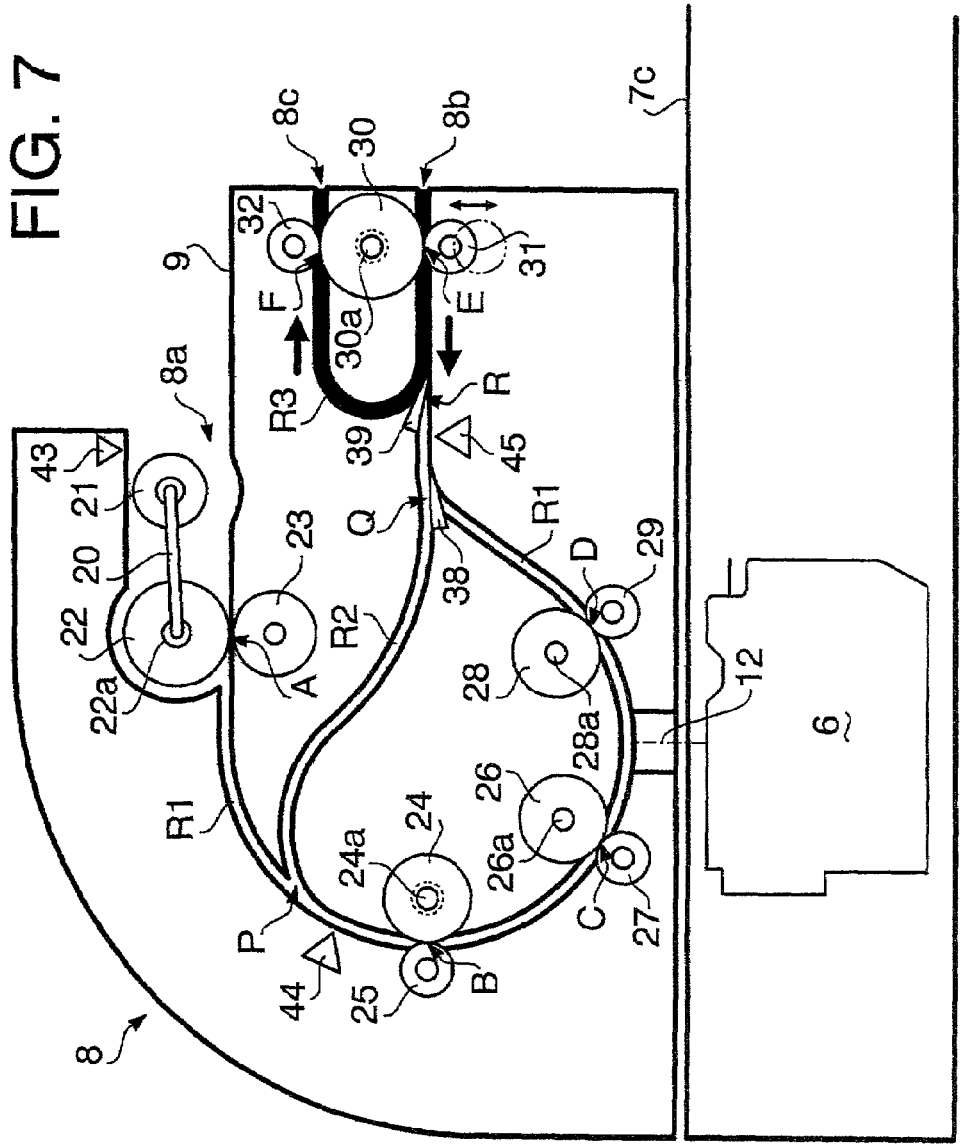
FIG. 7 is a side-cross sectional view of the ADF, similar to FIG. 5 showing the flow of the document in the third process.

The outline of the flow of the both-sides reading of the document sheet in the present invention will now be described. As in FIG. 5 (refer to FIG. 13 for the second embodiment in the present invention), in the first process, the document sheet set on the document stacking tray 9 with its front side facing up is fed from the document feeding port 8a to the nip A to the junction P to the nip B to the nip C to the nip D to the intersecting point Q to the intersecting point R to the nip E to the temporary outlet 8b and the right side of the document is read. Next, as shown in FIG. 6 (refer to FIG. 13 for the second embodiment in the present invention), in the second process, the reverse side of the document sheet is read as it is fed from the temporary outlet 8b to the nip E to the intersecting point R to the intersecting point Q to the junction P to the nip B to the nip C to the nip D to the intersecting point Q to the intersecting point R to the nip E to the temporary outlet 8b. As shown in FIG. 7 (refer to FIG. 13 for the second embodiment of the present invention), in the third process, the document sheet is fed from the temporary outlet 8b to the nip E to the intersecting point R to the nip F to the document discharging port 8c, the faces of the document are reversed and the document with its front side facing down is discharged into the discharge tray 7c.

Referring to the flow chart shown in from FIG. 8 to FIG. 12, the both-sides reading of the document sheet in the present invention will now be described.

Figure 8:
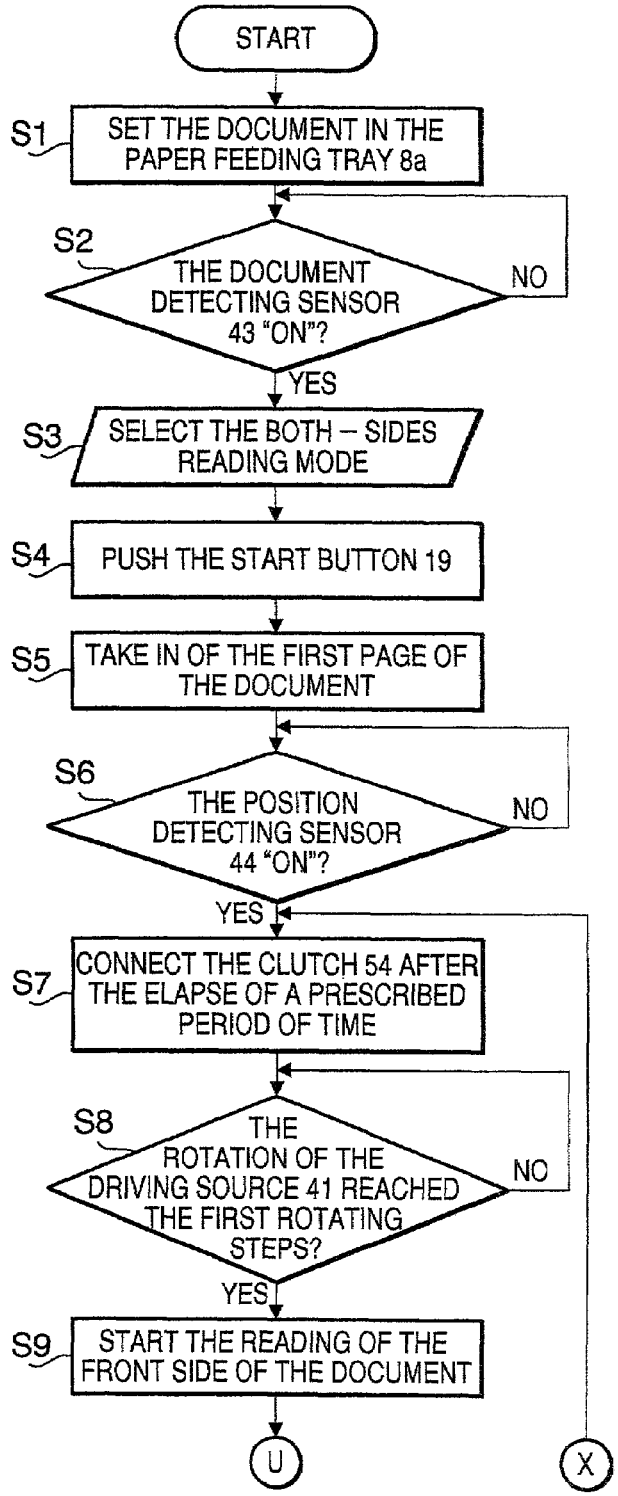
FIG. 8 is the flow chart of the first stage of the control mechanism of the both-sides image reading unit in the present invention.

As shown in FIG. 8, the user first sets the front side of the document sheet facing up on the document stacking tray 9, and when inserted into the inner most part of the document feeding port 8a (step S1), the upper end of the document sheet is detected by the document set sensor 43 (step S2) and the document can be taken in at any time.

Next, the user operates the liquid crystal display 18 of the control panel 13, selects the side of the document to be read as the both-sides reading mode (step S3), and when pressing the start button 19 employed in the control panel 13 (step S4), the control signal is output from the controller 40 to the driving source 41 of the each roller 22, 23, 24, 26, 28, 30, the actuator 51 of the pick up roller 21 and the clutch 52 of the separate roller 22, the positive pulse is applied on the solenoid of the actuator 51 and the solenoid is excited magnetically instantly. The pick up roller 21 then swings downward and presses down the document sheet, and this state is maintained until entire document sheet has been taken in. The drive source 41 starts moving and the clutch 52 of the separate roller 22 is connected simultaneously, and only the upper most layer of the document sheet (the first page of the document sheet) is separated by the pick up roller 21, the separate roller 22 and the retard roller 23 or the like, and is slowly taken in from the document feeding port 8a to the first document feeding path R1 (step S5).

When the upper end of the first page of the document sheet is detected by the first position detecting sensor 44 (step S6), the clutch 54 of the resist roller 24 is disconnected, the upper end of the first page of the document sheet collides against the resist follow roller 24 and the resist follow roller 25 to be fixed diagonally by curving the rear part, and a loop is formed by the document for performing skew correction. The loop is formed by the upper stream side roller feeding the document when the upper end of the document is stopped at the resist roller (step S7).

After a prescribed period of time elapses, the clutch 54 of the resist roller 33 is connected, the feeding of the first page of the document sheet starts, and at the controller 40, which is equivalent to the number of the rotating steps of the driving source 41 (the first rotating steps), which is equivalent to the distance needed for the upper end of the document sheet to be fed from the position of the nip B between the resist roller 24 and the resist follow roller 25 to the rear end of the platen glass 12 by the step control of the driving source 41, is measured and after reaching the first rotating steps (step S8), the control signal is output from the controller 40 to the scanner 6 and the clutch 52 of the separate roller 22 and the reading of the first page of the document sheet begins.

The clutch 52 of the separate roller 22 is disconnected and the separate roller 22 is stopped temporarily so that the next document sheet is not to be taken in continuously.

Figure 9:
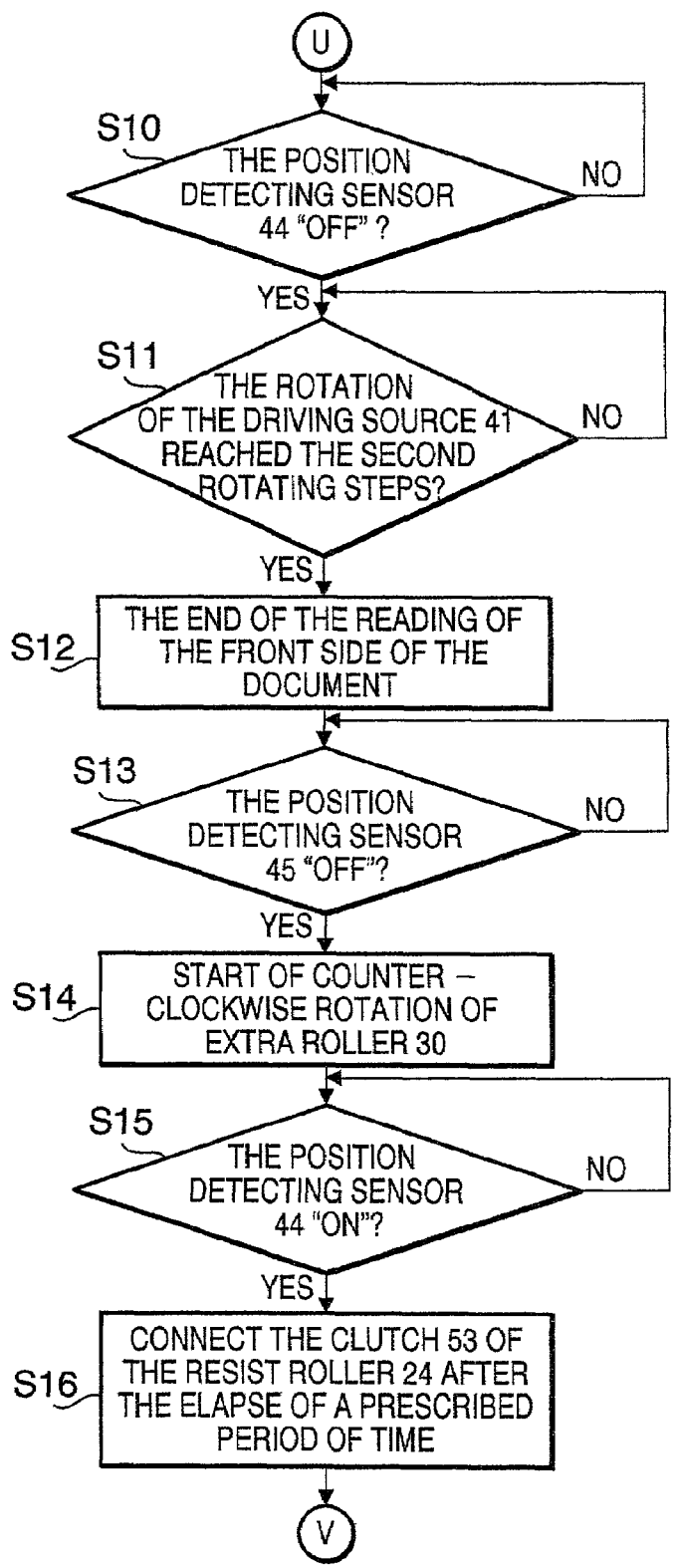
FIG. 9 is a flow chart similar to FIG. 8 showing the second stage.
Figure 10:
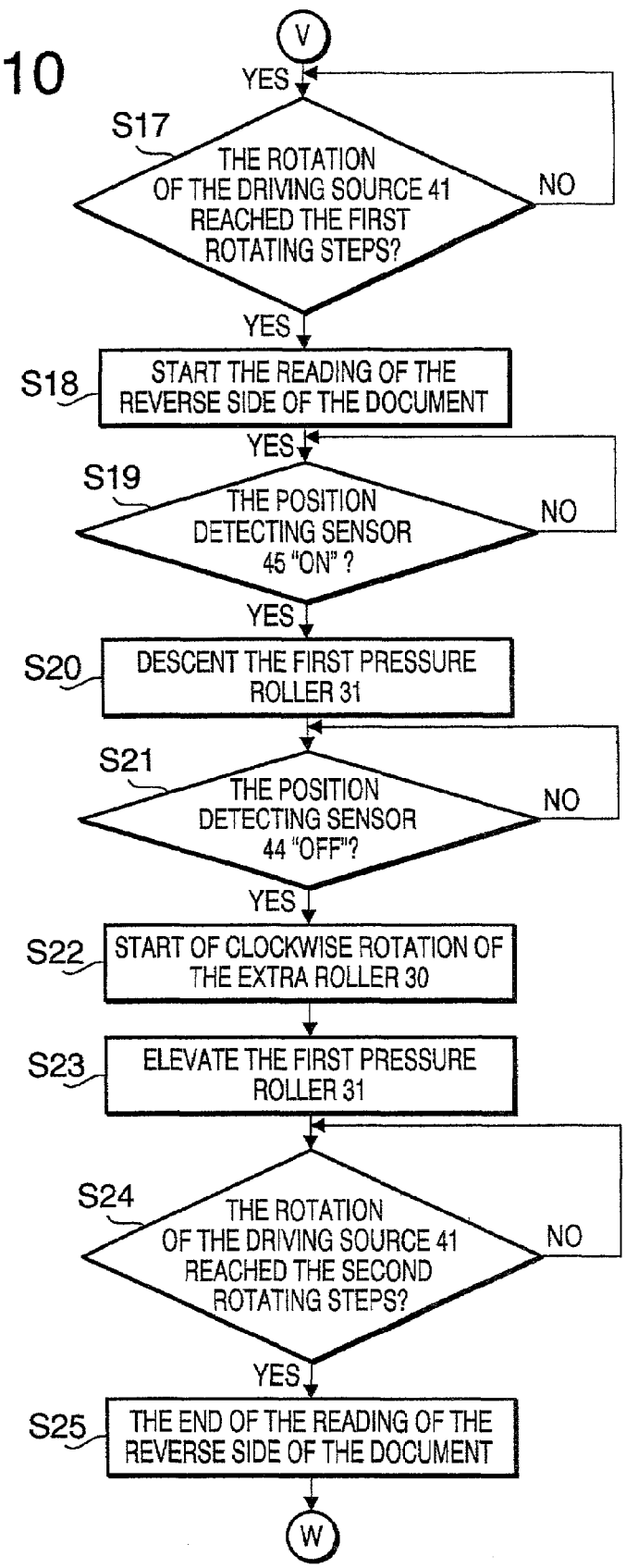
FIG. 10 is a flow chart similar to FIG. 8 showing the third stage.
Figure 11:
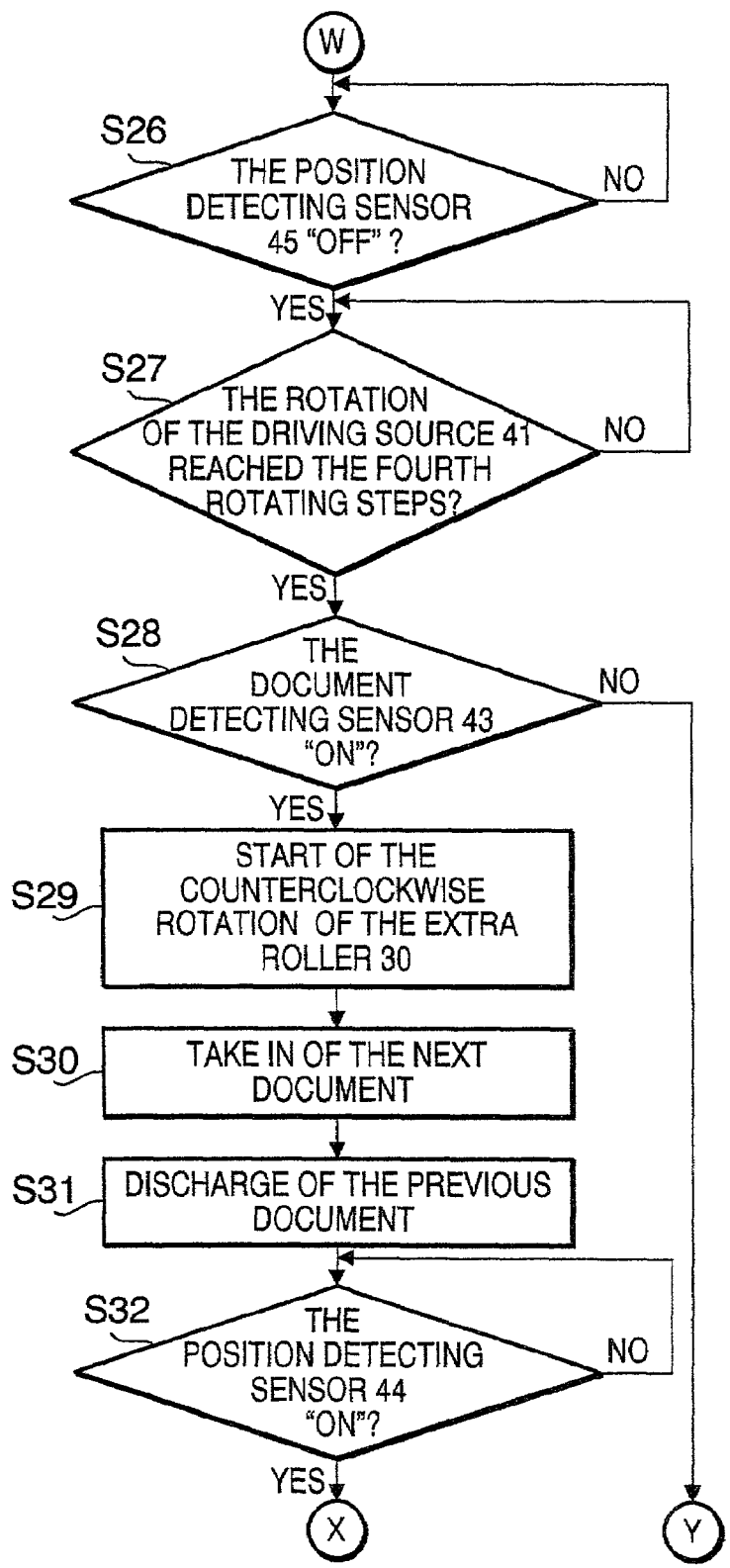
FIG. 11 is a flow chart similar to FIG. 8 showing the fourth stage.

Moreover, the resist roller 24 and the resist follow roller 25, the first feed roller 26 and the first slave roller 27, and the second feed roller 28 and the second slave roller 29 feed the first page of the document sheet, and as show in FIG. 9, when the first position detecting sensor 44 detects the end of the passage of the lower end of the first page of the document sheet (step S10), the detected signal is output by the controller 40 and the control signal is output from the controller 40.

Regarding the controller 40, after the passage of the lower end of the first page of the document sheet is detected by the first position detecting sensor 44, the number of rotating steps (the second rotating steps) of the driving source 41, equivalent to the distance needed by the lower end of the document sheet to be passed from the first position detecting sensor 44 to the platen glass 12 is measured, and after the second rotating step is reached (step S11), the scanning of the front side of the first page of the document sheet completes (step S12). The clutch 54 of the resist roller 24 is disconnected at the time being.

The first page of the document sheet pushes up the first changeover member 38 and the second changeover member 39 and opens the closed first document-feeding path R1. It is then fed downstream and when the lower end of the first page of the document sheet is detected by the second position detecting sensor 45 (step S13), the control signal is instantly output from the controller 40 to the either direction rotation switching mechanism 48 of the extra roller 30, and the upper end of the first page of the document sheet is discharged from the temporary outlet 8b, and the lower end of the document is located in the middle of the intersecting point Q and the intersecting point R, and the extra roller 30 is rotated counterclockwise (in FIG. 6, clockwise) with the second changeover member 39 pushed up (step S14).

After the lower end of the first page of the document sheet passes the intersecting point Q, the first changeover member 38 recovers by the elastic recovering force or empty weight and enables the passage through the second document feeding path R2, and the first document feeding path R1 is closed again so that the first page of the document sheet is fed to the second document feeding path R2 by the reverse rotation of the extra roller 30 and the first pressure roller 31.

The first page of the document sheet passes the second document feeding path R2, is fed from the junction P to the first document feeding path R1 again and when the upper end (the lower end before the switch back reversal) is detected by the first position detecting sensor 44 (step S11), the clutch 54 of the resist roller 24 is disconnected when the driving source 41 has rotated several steps, the upper end of the first page of the document sheet collides against the resist roller 24 and resist follow roller 25 to be fixed diagonally by curving the rear part, and a loop is formed by the document for performing skew correction. The loop is formed by the upper stream side roller feeding the document when the upper end of the document is stopped at the resist roller (step S16).

After the prescribed period of time elapses, the clutch 54 of the resist roller 33 is connected, the feeding of the first page of the document sheet starts and simultaneously at the controller 40, the step control of the driving source 41 measures the first rotating steps, and the first rotating steps is reached (step S17), the control signal is output from the controller 40 to the scanner 6 and the reading of the reverse side of the first page of the document sheet starts (step S18).

The first page of the document sheet is fed by the resist roller 24 and the resist follow roller 25, the first feed roller 26 and the first slave roller 27, and the second feed roller 28 and the second slave roller 29, and when the upper end of the first page of the document sheet is detected by the second position detecting sensor 45 (step S19), the control signal is output from the controller 40 to the elevating mechanism 49 of the first pressure roller 31, the elevating mechanism 49 descends the first pressure roller 31 and separates the extra roller 30 and the first pressure roller 31 (step S20).

The upper end and the lower end of the document sheet, of which the feeding direction is the opposite of one another, pass each other smoothly at the nip E, and when the lower end of the first page of the document sheet passes the first position detecting sensor 44 (step S21), the detected signal is output from the controller 40, and the control signal is output from the controller 40 to the either direction rotation switching mechanism 48 of the extra roller 30, the elevating mechanism 49 of first pressure roller 31, and the scanner 6.

The extra roller 30 is rotated clockwise (in FIG. 6, counterclockwise) (step 822), the first pressure roller 31 is elevated, and the extra roller 30 and the first pressure roller 31 are nipped again (step 823), When the passing of the lower end of the first page of the document sheet is detected by the first position detecting sensor 44 in the controller 40, the second rotating step is measured by the step control of the driving source 41, and after the second rotating step is reached (step 824), the reading of the reverse side of the first page of the document sheet completes (step 825).

As shown in FIG. 13, the first page of the document sheet is fed furthermore, the lower end of the first page of the document sheet passes the position of the second position detecting sensor 45 (step S26), the detected signal is output to the controller 40, and the number of the rotating steps of the driving source 41 (the third rotating steps), which is equivalent to the distance needed for the lower end of the document sheet to be fed from the second position detecting sensor 45 to nip E of the extra roller 30 and the first pressure roller 31, is measured by the step control of the driving source 41 at the controller 40. At the moment when the third rotating steps is reached (step S27), in the case the next document sheet (the second page of the document sheet) is detected in the document feeding port 8a by the document set sensor 43 (step S28), the control signal is output from the controller 40 to the either direction rotation switching mechanism 48 of the extra roller 30, the actuator 51 of the pick up roller 21, and clutch 52 of the separate roller 22, and the most part of the first page of the document sheet is discharged from the temporary outlet 8b, and with the condition in which the extra roller 30 and the first pressure roller 31 are nipping only the lower end of the document, the extra roller 30 is rotated counterclockwise (in FIG. 7, clockwise) (step S29). Clutch 52 of the separate roller 22 is connected at the same time, the pick up roller 21, the separate roller 22, and the retard roller 23 or the like separate the next document sheet on the top layer (the second page of the document sheet) and it is taken in from the document feeding port 8a to the first document feeding path R1 (step S30).

After the lower end of the first page of the document sheet passes the intersecting point R, the second changeover member 39 is recovered by the elastic recovering force or empty weight and disconnects the first document feeding path R1, and the extra roller 30 and the first pressure roller 31 feed the first page of the document sheet to the third document feeding path R3.

The first page of the document sheet is fed by the extra roller 30 and the second pressure roller 32 is discharged from the document discharging port 8c with the front side of the document sheet faced down (step S31), and at the same time, the second page of the document sheet is fed through the first document feeding path R1 and the upper end of the second page of the document sheet is detected by the first position detecting sensor 44 (step S32), and both-sides of the document sheet are read, going back to the step S7 above, as with the first page of the document sheet.

Figure 12:
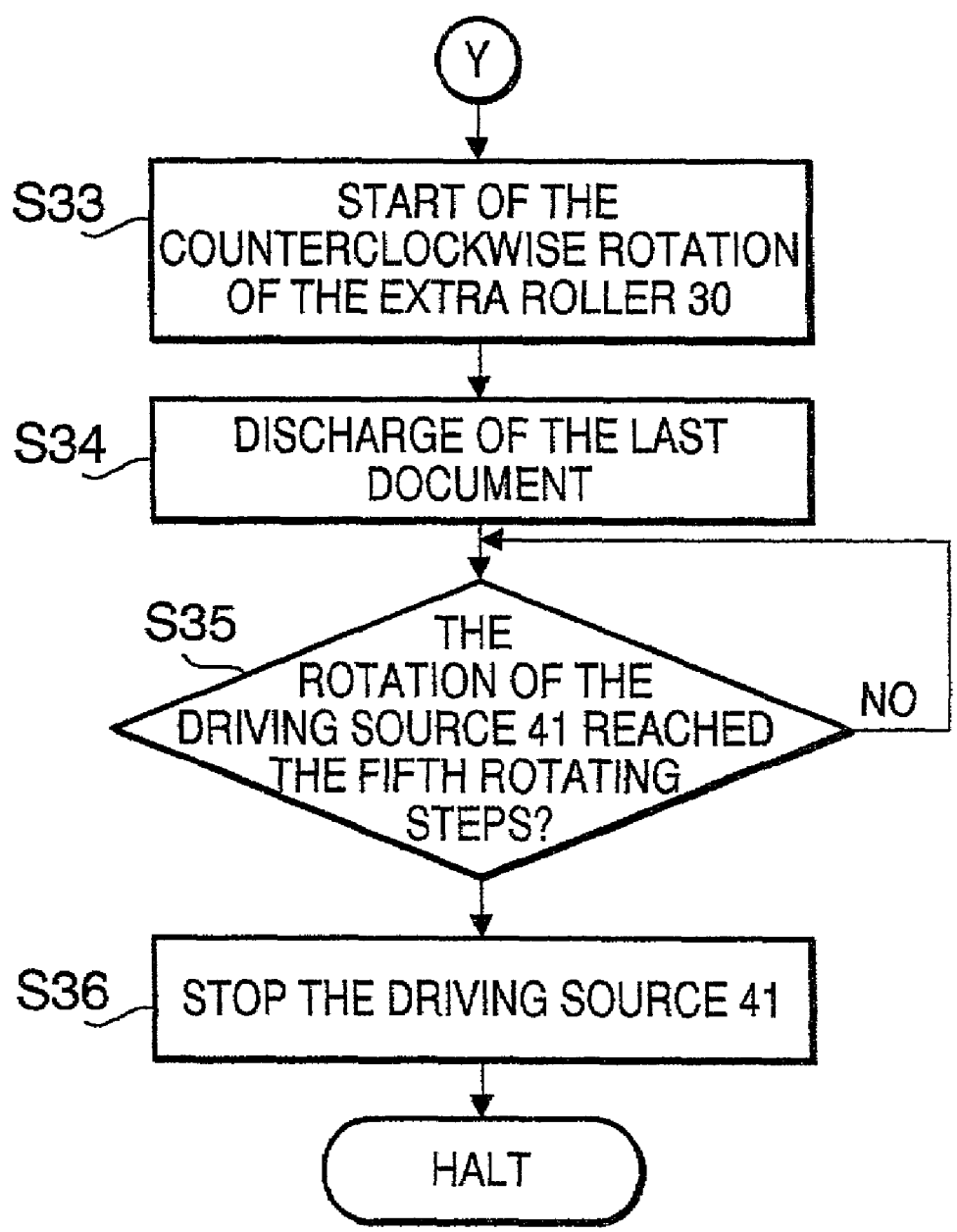
FIG. 12 is a flow chart similar to FIG. 8 showing the last stage.

The document sheet is taken in accordingly, however, when the reading of both-sides of the last page of the document sheet is completed, since there is no more document sheet to be read, the document set sensor 43 is put OFF and in the step S28, "NO" is selected, such that as shown in FIG. 12, the control signal is only output to the either direction rotation switching mechanism 48 of extra roller 30 from the controller 40, and the most part of the last document sheet is discharged from the temporary outlet 8b, the extra roller is rotated counterclockwise (in FIG. 7, clockwise), with only the lower end of the document sheet nipped by the extra roller 30 and the first pressure roller 31 (step S33).

Strictly stating, the document set sensor 43 is put OFF when the take in of the last document sheet is completed, the control signal is output to the actuator 51 of pickup roller 21 from the controller 40, and the negative pulse is applied on the solenoid. The solenoid is instantly excited magnetically, and the pick up roller 21 is swung upward, returning to the original position and the document sheet is not pressed down for the time being.

When the lower end of the last page of the document sheet passes the intersecting point R, the second changeover member 39 is recovered by the elastic recovering force or empty weight, and is disconnecting the first document feeding path R1, the lower end of the document sheet is fed by the extra roller 30 and the first pressure roller 31 through the third document feeding path R3.

The last document sheet is fed by the extra roller 30 and the second pressure roller 32 and is discharged from the document discharging port 8c with its front side facing down (step S34).

After the rotating direction of the extra roller 30 is reversed in the step S34, the number of the rotating steps (the fourth rotating steps) of the driving source 41 until the last document sheet passes through the third document feeding path R3 and is discharged completely, is measured at controller 40, and when the fourth rotating steps is reached (step S35), the control signal is output to driving source 41 and the driving source 41 is stopped (step S36).

The reading of the first page of the document sheet through the last document sheet is operated likewise and the series of the functions is completed.

As constructed likewise, the document passes over the platen glass 12, which is the reading position of the document sheet, only twice for the reading of the front side and the reverse side of the document, thus the next document sheet can be taken in to the first document feeding path R1 right after the reading of the both-sides of the document, speeding up the document reading.

Moreover, the document sheet being discharged after both-sides reading passes through the third document feeding path R3 which does not pass through the reading position, is loaded in the original page order on the discharge tray 7c, resulting in the improvement of the operation efficiency.

In the present invention, the feeding distance of the document sheet is measured by the step control of the driving source, however, the rotating shaft 24a of the resist roller 24, and the rotating shaft 30a of the extra roller 30 may include the angle sensor 46 and 47, and the feeding distance of the document sheet may be measured by detecting the rotating steps of each roller at the controller 40.

By employing the resist roller 24 and the resist follow roller 25 at the downstream of the junction P, single-side, both-sides readings can be performed by one resisting means.

Even by not adapting the path switching method using actuator of the solenoid or the like, and just by inexpensive members, the path can be switched to the path toward the reading unit to the path toward the discharging member, resulting in simplifying the whole apparatus and reducing the cost.

What is claimed is:

1. A duplex automatic document feeder comprising:

a document stacking tray for stacking a set of documents;

a document separating/feeding unit having a document feeding port for separating the set of documents and feeding the documents one by one from the uppermost document thereof;

an image reading unit for reading the image data on the first side of the document passing the image reading position;

a document inverting unit for inverting the document feeding direction to read the image data on the second side of the document which passes the image reading position after the reading of the first side has been completed;

a document discharging unit for piling up the documents on the document-discharging tray after the front and the reverse side of the document of which both-sides have been read is reversed, with the document not passing on the image reading position;

a first transporting path for guiding the document from the document separating/feeding unit to the image reading position and having a document set sensor near the document feeding port in the first transporting path;

a second transporting path for guiding the document from the said image reading position to the document inverting unit;

a third transporting path for guiding the document from the said document inverting unit to a first intersecting point of the first transporting path and from this first intersecting point to the said image reading positing, wherein a first position detecting sensor is located near the first intersecting point;

a fourth transporting path for guiding the document from a second intersecting point in the midst of the said third transporting path to the said document discharging unit, wherein a second position detecting sensor is located near the second intersecting point; and a switching member employed in the said second intersecting point which switches the document feeding path from the said document inverting unit to the third transporting path or the fourth transporting path from this intersecting point.

2. The duplex automatic document feeder according to claim 1 employs the said intersecting point between the document edge position which becomes the upper end when the feeding direction is reversed toward the scanning unit again after the reading of the first side is completed and the document edge position which becomes the upper end when the feeding direction is reversed toward the discharging unit after the reading of the second side of the document is completed.

3. The duplex automatic document feeder according to claim 2 wherein the flexible switching member is impelled at the said intersecting point for feeding the document to the fourth transporting path.

4. The duplex automatic document feeder according to claim 3, wherein the flexible switching member is recovered by elastic recovering force.

5. The duplex automatic document feeder according to claim 3, wherein the flexible switching member is recovered by empty weight.

6. The duplex automatic document feeder according to claim 3, wherein the flexible switching member is a film.

7. The duplex automatic document feeder according to claim 2 further including a resist member to correct the skew of the document in the downstream position of the said intersecting point.

8. The duplex automatic document feeder according to claim 1 wherein the said document inverting unit and the said document discharging unit are comprised of not more than three rollers neighboring one another.

9. The duplex automatic document feeder according to claim 8, wherein axes of the three rollers are aligned when viewed from the side.

10. The duplex automatic document feeder according to claim 8, wherein the three rollers are rotatable in either direction.

11. The duplex automatic document feeder according to claim 8, wherein the three rollers include an extra roller and a first pressure roller, and wherein the extra roller and the first pressure roller are separated by a distance.

* * * * *